United States Patent [19]

Detweiler et al.

[11] 4,227,445

[45] Oct. 14, 1980

[54] MOTOR WITH MULTIPLE OUTPUT MEMBERS

[75] Inventors: Charles A. Detweiler; Dennis A. Rainwater, both of Durand, Mich.

[73] Assignee: Schmelzer Corporation, Durand, Mich.

[21] Appl. No.: 946,747

[22] Filed: Sep. 29, 1978

[51] Int. Cl.³ .................................................. F16J 1/10

[52] U.S. Cl. .......................................... 92/84; 92/100; 92/113; 92/140

[58] Field of Search .................... 92/84, 113, 140, 100; 261/39 B; 74/471 R

[56] References Cited

U.S. PATENT DOCUMENTS

| | | | |
|---|---|---|---|
| 3,773,023 | 11/1973 | Taylor | 261/39 B |
| 3,878,769 | 4/1975 | Farmer | 92/113 X |
| 4,098,459 | 7/1978 | Benjamin | 92/48 X |
| 4,181,065 | 1/1980 | Benjamin et al. | 92/100 X |

*Primary Examiner*—Irwin C. Cohen
*Attorney, Agent, or Firm*—Fisher, Gerhardt, Crampton & Groh

[57] ABSTRACT

A fluid pressure motor having a movable diaphragm assembly and an output assembly housing a plurality of output members at least some of which can move relative to the diaphragm assembly and can be connected to separate devices for control by a single differential control pressure in the motor.

4 Claims, 9 Drawing Figures

MOTOR WITH MULTIPLE OUTPUT MEMBERS

This invention relates to fluid pressure motors and particularly to vacuum motors of the type used in controlling carburetors on internal combustion engines.

Vacuum motors, sometimes called vacuum breaks, are used with carburetors of internal combustion engines for the purpose of at least partially opening the carburetor choke after the engine is started. In addition to performing this function, some vacuum breaks are expected to provide a biasing force to urge the carburetor choke valve to its fully closed position when the engine is not operating. Also, some carburetors are provided with additional air valves or choke valves which require separate controls. Also, some of the carburetor valves or choke valves are provided with a temperature responsive bimetal member which is adapted to urge the valve to a closed position with a force inversely proportional to temperature. In some arrangements the vacuum break is resiliently connected to the choke linkage to resiliently resist opening movement of the choke valve against the force of the bimetal temperature responsive control in an effort to provide an air fuel mixture related to ambient temperature. These and other functions are typically carried out with separate vacuum-operated motors so that two or more motors are required for each carburetor.

It is an object of the present invention to provide a fluid pressure motor in which a plurality of functions may be carried out with a single motor.

The objects of the invention are accomplished by a fluid pressure motor having a diaphragm assembly movable in response to differential pressure and include an output assembly having a plurality of output members. The output members may be provided with biasing means to resiliently resist movement of the output members depending on the control load to which they are subjected. If desired, the control members may be made to move with the movable wall. Also the biasing means are so arranged that at least one of them can be used to modify the action of the other output members.

These and other objects of the invention will become apparent from the following description and from the drawings in which.

Figures 1, 2, 3:
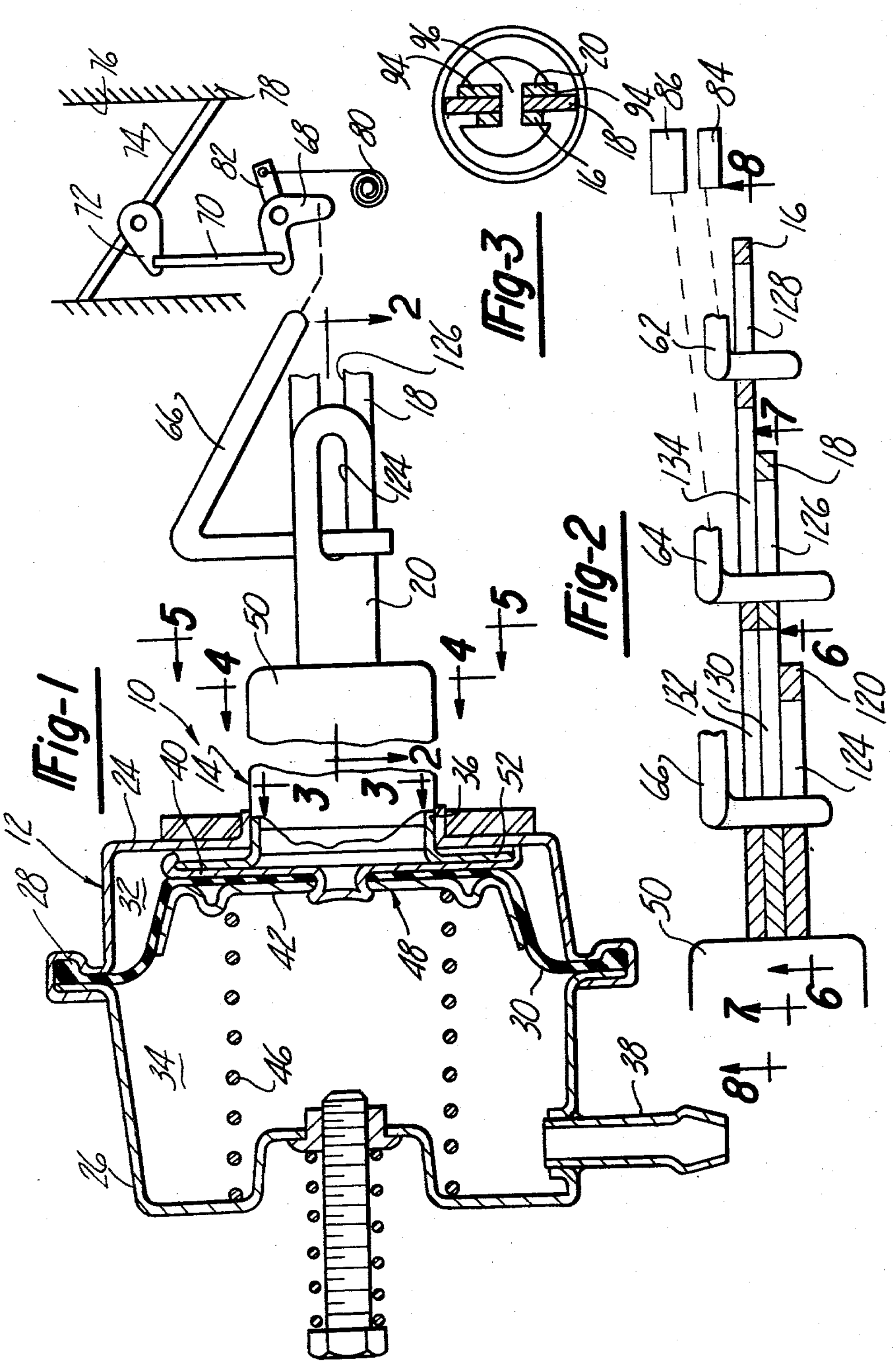
FIG. 1 is a cross sectional view of a control motor embodying the invention with associated parts of a carburetor control system shown diagrammatically.
FIG. 2 is a top sectional view taken on line 2—2 in FIG. 1 with associated control mechanism shown diagrammatically.
FIG. 3 is a cross sectional view taken on line 3—3 in FIG. 1.

A control motor embodying the invention is designated generally at 10 and includes a housing 12 and an output assembly 14 including a plurality of output members 16, 18 and 20 each of which can be operated to control a separate function of a carburetor.

The housing 12 of the motor 10 includes front cover 24 and a rear cover 26 clamped together to hold the flange 28 of a diaphragm 30. The diaphragm 30 acts to divide the interior of the housing 12 into a front chamber 32 and a rear chamber 34. The front chamber 32 is in constant communication with atmospheric air through a large opening 36 in the front cover 24 which also acts to slidably support the output assembly 14. Rear chamber 34 is connected by means of an inlet tube 38 to a source of vacuum such as that afforded by the intake manifold of an internal combustion engine which is not shown.

Opposite sides of the diaphragm 30 are provided with backing plates 40 and 42 which are clamped at opposite sides of the diaphragm 30 by means of an upset head portion 44. A spring 46 acts between the rear backing plate 42 and the interior wall of the rear cover 26 to urge the diaphragm 30 with the plates 40 and 42 to the right as viewed in FIG. 1 so that the front plate 40 engages an interior wall of the front cover 24. The plates 40 and 42 together with the diaphragm 30 form a diaphragm assembly or movable wall 48.

The front plate 40 supports the output assembly 14 which includes a carriage member 50. The carriage member 50 has a radially extending flange 52 at one end which is fastened to the front plate 40 for movement with the diaphragm assembly 48 forming the movable wall between the chambers 32 and 34.

Figure 5:
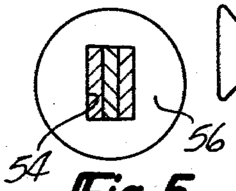
FIG. 5 is a cross sectional view taken on line 5—5 in FIG. 1.

The carriage 50 slidably contains the output members 16, 18 and 20. The output members are elongated and made of flat material and are stacked in contacting relationship with each other as seen in FIGS. 2 and 3 and pass through an opening 54 in an end wall 56 formed in the end of the carriage 50 as seen in FIG. 5. The output members 16, 18 and 20 are connected to links 62, 64 and 66, respectively by way of slots forming lost motion connections. The side by side relationship places the pulling load of the output members 16, 18 and 20 very close to the central axis of motor 10. Links 62, 64 and 66 may be connected to separate devices associated with the carburetor. One such arrangement is illustrated in FIG. 1 in which the link 66 is connected through a bellcrank 68, link 70 and control arm 72 to a choke valve 74 in an air induction passage 76 of a carburetor 78. The choke 74 also is connected to a temperature responsive, bimetal choke control device 80 through an arm 82 to the bellcrank 68, link 70 and arm 72 to rotate the choke valve 74 toward its closed position with a force inversely proportional to temperature. At low ambient temperatures the choke valve 74 is urged toward its closed position. Links 62 and 64 may be connected to other valves or devices indicated diagrammatically at 84 and 86.

Figure 6:
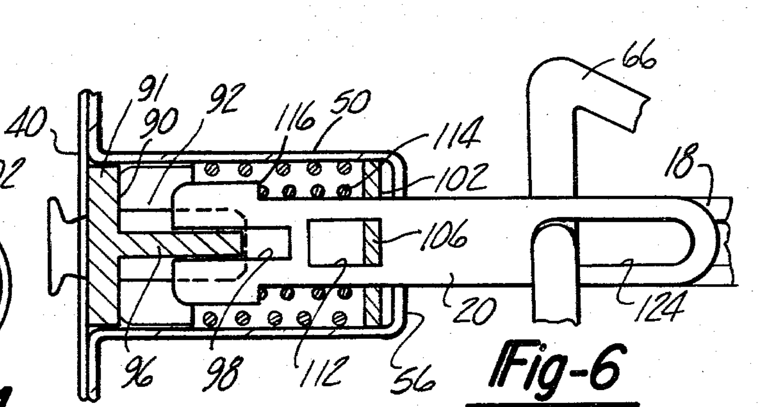
FIG. 6 is a cross sectional view showing only one of the output members and taken generally on line 6—6 in FIG. 4.
Figure 7:
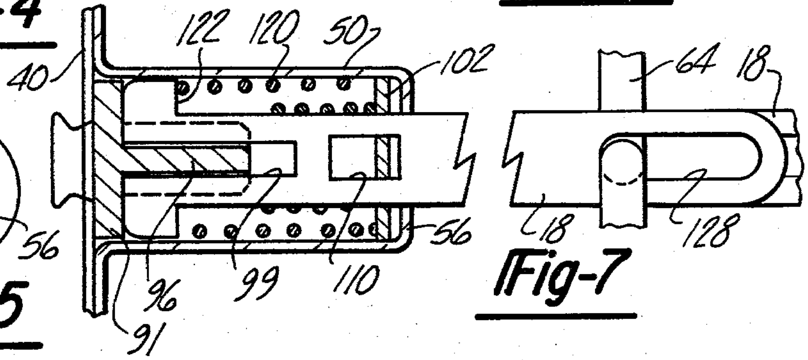
FIG. 7 is a view similar to FIG. 6 showing another of the output members taken generally on line 7—7 in FIG. 4.

Referring now to FIGS. 3, 6 and 7, the interior of the carriage member 50 is provided with a guide member 90 having a flange portion 91 pressed against the interior walls of the carriage 50 and the backing plate 40. The guide member 90 is provided with a stem portion 92 extending axially within the interior of the carriage 50. Referring to FIG. 3, the stem 92 has opposed slots 94 at opposite sides of a wall 96. The wall 96 slidably receives the slots 98, 99 and 100 formed in the ends of the output members 16, 18 and 20, respectively, to permit sliding movement of the output members relative to the guide member 90.

Figure 4:
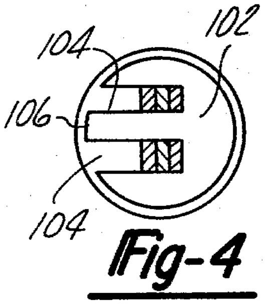
FIG. 4 is a cross sectional view taken on line 4—4 in FIG. 1.

The end of the carriage member 50 opposite to the guide member 90 is provided with a seat element 102 which as seen in FIG. 4 includes a pair of grooves 104 separated by a tongue 106.

An intermediate portion of each of the output members 16, 18 and 20 has an opening 108, 110 and 112, respectively. The openings are disposed in laterally aligned relationship to each other and commonly received the tongue 106 of the seat element 102. The openings 110 and 112 are elongated to permit relative sliding movement between the seat element 102 and the output members 110 and 112. The opening 108, however, is only sufficiently large to receive the tongue 106 and does not permit any relative movement between the seat element 102 and the output member 16.

Referring now to FIG. 6, a coiled compression spring 114 has one end seated against the seat element 102 and its opposite end engaged with a shoulder 116. The spring 114 acts to resist relative movement of the output member 20 to the right relative to the seat element 102 as viewed in FIG. 6.

Referring now to FIG. 7, a coiled compression spring 120 is disposed within carriage 50 and is coiled around the output member 18 as well as the output member 20 and its spring 114. The spring 120 has one end seated against the seat elements 102 and its opposite end seated against a shoulder 122 on output member 18 to urge the output member 18 and seat element 102 apart relative to each other.

The various parts will assume the position seen in FIG. 1 in the installed condition of the motor 10 relative to a carburetor 78 of an internal combustion engine when the engine is not operating. In that condition, the diaphragm assembly is disposed so that the backing plate 40 engages the front cover 24. Also, with the choke plate 74 closed the link 66 engages the left end of the slot 124 and holds the output member 20 to the left a slight amount so that the seat element 102 is held out of engagement with the end wall 56 as seen in FIG. 6.

Referring to FIG. 7, the spacing of the seat element 102 from the end wall 56 tends to compress the spring 120 a slight amount between the seat element 102 and the shoulder 122 because movement of the output member 18 to the left is resisted by its engagement with the flange 91. Under these conditions the spring 120 tends to urge the seat element 102 to the right as viewed in FIG. 5 and relative to the output member 18. At the same time such spring action urges the output members 16 and 20 to the right due to engagement of the tongue 106 of the seat element 102 with the end wall in each of the openings 108 and 112. The spring 114 is not affected by the action of the spring 120 and serves to maintain the seat element 102 at the right end of the slot or opening 112. The output member 16 is for all practical purposes fixed to the spring seat element 102 which moves as a unit with the output member 16.

Figure 8:
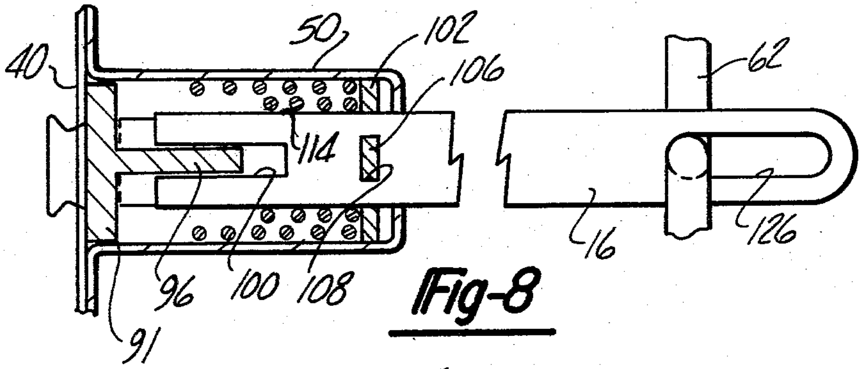
FIG. 8 is a cross sectional view similar to FIGS. 6 and 7 showing still another output member and taken generally on line 8—8 in FIG. 4.

Under the conditions illustrated in FIGS. 6, 7 and 8, with the engine not operating, the output members 16 and 20 are urged to the right by the action of spring 120. The output members 16 and 18 can be connected to instrumentality such as the choke valve 74 illustrated in connection with the output member 16. Under such circumstances the output members 16 and 20 are urged in one direction to the right and such biasing action can be employed to position valves such as the choke valve 74 in a particular position. In the instance of the output member 20 the action is operative to urge the choke valve toward a closed position to assist the action of the bimetal control unit 80.

Figure 9:
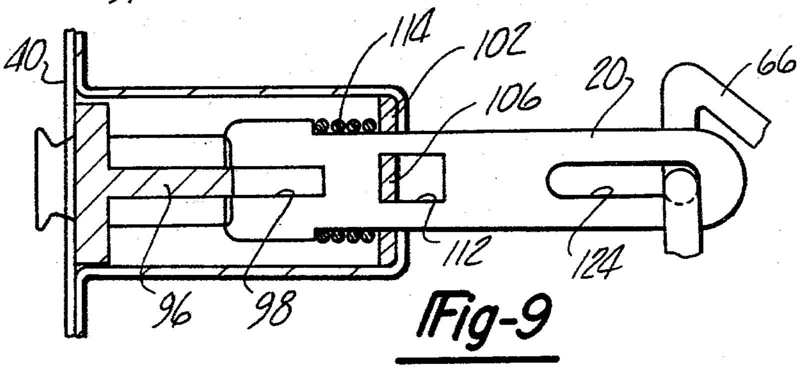
FIG. 9 is a view of the output member seen in FIG. 6 but showing another condition of operation.

When vacuum is established in the rear chamber 34 as will occur when the engine begins operation, a differential in pressure is created across the diaphragm 30 because of the atmospheric pressure existing in the front chamber 32. As a result, the output assembly 14 is moved to the left as viewed in FIG. 1. Because of such movement, the right end of the slot 124 comes into engagement with the link 66 (FIG. 9) and tends to move it to the left to move the various control linkages associated with the choke valve 74. Such movement pulls the output member 20 to the left so that the left end of the slot 112 engages the seat element 102 and begins compressing the spring 114. The spring 114 is therefore operative to resiliently resist movement of the output member 20 upon movement of the movable wall formed in part by the diaphragm 30 to the left as viewed in FIG. 1. This is frequently referred to as modulating action in which the movement of the output member 20 is resiliently resisted and is dependent on the force applied by bimetal control element 80 and the forces of moving air on the choke plate 74.

If the middle output member 18 is connected similarly to a valve device, movement of the diaphragm 30 to the left upon establishment of vacuum pressure in the chamber 34 will cause resilient resistance to such movement by the action of the spring 120.

Movement of the diaphragm assembly 48 to the left upon admission of vacuum to the chamber 34 will cause the output member 20 seen in FIG. 8 to move as a unit with the diaphragm assembly.

Each of the output members 16, 18 and 20 can be connected to a separate valve control such that movement of the movable wall 48 to the left causes the output members 16 and 18 to move therewith but resiliently, depending on the opposition to such movement. At the same time the output member 16 moves as a unit with the movable wall which includes the diaphragm 30.

The output members 16, 18 and 20 are so arranged that the output members 16 and 20 are urged in one direction, namely to the right, due to the action of the spring 120 acting on the seat element 102. Also, movement of the output member 20 to the right relative to the carriage 50 will be resisted by the spring 114. Movement of the output member 18 relative to the carriage member 50 is resiliently resisted by the spring 120 independently of the action of the spring 114. The output member 16 is fixed to seat 102 and will be urged to the right relative to the carriage member 50 due to the action of the spring 120.

As soon as vacuum pressure is established to cause the diaphragm 30 to move to the left, the seat element 102 will first come into engagement with the end wall 56 due to the action of the spring 120. Immediately thereafter the carriage member 50 together with the seat element 102 will move to the left relative to the stationary links 118 and 120 until the seat element 102 comes into engagement with the left end of the openings 110 and 112. During such movement of the seat element 102 the output member 16 will move with the seat element 102. After the seat element 102 engages the left end of each of the openings 110 and 112, continued leftward movement of the diaphragm 30 will tend to pull the output members 18 and 20 to the left against the resistance of the springs 114 and 120 depending on the load or resistance on the output members 18 and 20.

During such movement the output member 16 will continue to move as a unit with the movable wall formed in part by the diaphragm 30.

During operation of an internal combustion engine vacuum will be maintained in the rear chamber 34 to maintain the diaphragm 30 to the left together with the carriage 50. When disposed in such a position, the slot 124 and the link 66 as well as similar slots 126 and 128 in the output members 16 and 18 permit movement of the associated links 62, 64 and 66 independently of the output members 16, 18 and 20. Such independent movement is obtained by way of the lost motion connections afforded by slots 124, 126 and 128 which receive transversely bent portions of links 62, 64 and 68. The slot 124 in output member 20 is aligned with portions of slots 130 and 132 in links 18 and 16, respectively. The transverse bent portion of link 66 passes through all of the slots 124, 130 and 132 although only movement of the link 20 is operative to move the link 66. Similarly the slot 126 in output member 18 is in alignment with a portion of a larger slot 134 in link 18 so that only the output member 18 is effective on the movement of link 64. Link 62 passes through the slot 128 formed in the extreme end of output member 16. If desired, the connection between link 62 and output member 16 may be provided by a close clearance hole instead of the slot 128 so that the link 62 follows the motion of the output member 16. Similarly, the slots 124 or 126 in the links 20 and 18 could be omitted, depending on the type of control desired to be achieved. In such instances slots such as 130, 132 and 134 in adjacent output members would remain to prevent interference of independent movement of each of the output members 16, 18 and 20.

When operation of the engine is terminated or the engine is operating under heavy load and low manifold vacuum air is re-established in the rear chamber 34 and equal pressures in the opposed chambers 32 and 34 causes the diaphragm 30 to return to the right to the position in which it is shown in FIG. 1 and the spring 120 will react against the seat element 102 to resiliently urge the output members 16 and 20 to the right as viewed in FIGS. 6 and 7.

A fluid pressure motor has been provided which has a housing and a pressure responsive movable wall in the housing connected to a plurality of output members each of which can be connected to a separate control such as valves on a carburetor to perform various functions. The compact arrangement includes nested output members and springs which can be used to perform a choke assist control in which a choke or other valve control is moved toward a closed position and a modulating control in which the link moving a control is resiliently connected so that movement is dependent on the load of the valve resisting such movement.

The embodiment of the invention in which an exclusive property or privilege is claimed are defined as follows:

1. A fluid pressure motor comprising a housing, a movable wall in said housing forming chambers at opposite sides and being movable in response to differential pressure at opposite sides of said wall, means for varying the pressures in said chambers to create said differential pressure, an output assembly having a carriage member connected to said wall and a plurality of output members movably supported relative to said carriage member, all of said output members being mounted with their axes parallel and movable in one direction during movement of said wall from a first to a second position, a first biasing means resisting movement of a first output member in one direction relative to said carriage, and a second biasing means resisting movement of a second output member in said one direction relative to said carriage and assiting movement of said first output member in the opposite direction relative to said carriage, a third output member, said third output member being connected to said carriage member for movement with said wall as a unit, a seat member mounted in carriage member and engaged by said first and second biasing means, each of said first and second output members having a lost motion connection with said seat member permitting movement of said output members relative to said wall, the third output member being connected to said seat member.

2. The combination of claim 1 wherein said second biasing means assists movement of said third output member.

3. The combination of claim 1 wherein one of said output members has a lost motion connection with a device to be operated.

4. The combination of claim 1 wherein each of said output members has a lost motion connection for connection with a member to be operated.

* * * * *